United States Patent
Besshi

(10) Patent No.: US 9,746,963 B2
(45) Date of Patent: Aug. 29, 2017

(54) DETECTION METHOD USING CAPACITIVE SENSOR, AND ELECTRONIC DEVICE

(71) Applicant: Panasonic Intellectual Property Management Co., Ltd., Osaka (JP)

(72) Inventor: Takuma Besshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/895,001

(22) PCT Filed: Jul. 17, 2014

(86) PCT No.: PCT/JP2014/003793
§ 371 (c)(1),
(2) Date: Dec. 1, 2015

(87) PCT Pub. No.: WO2015/011902
PCT Pub. Date: Jan. 29, 2015

(65) Prior Publication Data
US 2016/0124576 A1    May 5, 2016

(30) Foreign Application Priority Data
Jul. 24, 2013 (JP) .................................. 2013-153467

(51) Int. Cl.
G06F 3/041   (2006.01)
G06F 3/044   (2006.01)

(52) U.S. Cl.
CPC ............ *G06F 3/0418* (2013.01); *G06F 3/044* (2013.01); *G06F 3/0416* (2013.01)

(58) Field of Classification Search
None
See application file for complete search history.

(56) References Cited

U.S. PATENT DOCUMENTS

2010/0052769 A1    3/2010  Yamaguchi
2013/0038556 A1*   2/2013  Nakai ................ G01C 21/3611
                                                         345/173
(Continued)

FOREIGN PATENT DOCUMENTS

JP    2008-033701    2/2008
JP    2009-181232    8/2009
(Continued)

OTHER PUBLICATIONS

The Extended European Search Report dated Jun. 8, 2016 for the related European Patent Application No. 14829431.7.
(Continued)

*Primary Examiner* — Nicholas Lee
(74) *Attorney, Agent, or Firm* — Greenblum & Bernstein, P.L.C.

(57) ABSTRACT

A basic scan executing a bare-hand scan for determining whether or not an electrode of a capacitive sensor is manipulated with a bare hand and a gloved-hand scan for determining whether or not the electrode is manipulated with a gloved hand is executed, thereby determining which of the bare hand and the gloved hand the electrode is manipulated with. This detection method reduces erroneous detection of the capacitive sensor.

10 Claims, 9 Drawing Sheets

(56) References Cited

U.S. PATENT DOCUMENTS

| | | | | |
|---|---|---|---|---|
| 2013/0293506 A1* | 11/2013 | El-Khaled | .......... | G01C 21/3664 |
| | | | | 345/174 |
| 2014/0111430 A1* | 4/2014 | Shima | ..................... | G06F 3/044 |
| | | | | 345/157 |
| 2014/0267085 A1* | 9/2014 | Li | ........................... | G06F 3/041 |
| | | | | 345/173 |

FOREIGN PATENT DOCUMENTS

| | | |
|---|---|---|
| JP | 2012-103995 | 5/2012 |
| JP | 2013-084052 | 5/2013 |

OTHER PUBLICATIONS

International Search Report of PCT application No. PCT/JP2014/003793 dated Sep. 30, 2014.

* cited by examiner ns may not be made accurately depending on such
DETECTION METHOD USING CAPACITIVE SENSOR, AND ELECTRONIC DEVICE This application is a U.S. national stage application of the PCT international application No. PCT/JP2014/003793 filed on Jul. 17, 2014, which claims the benefit of foreign priority of Japanese patent application 2013-153467 filed on Jul. 24, 2013, the contents all of which are incorporated herein by reference.

TECHNICAL FIELD

The present invention relates to a detection method using a capacitive sensor to be mounted to various electronic apparatuses, and to an electronic device equipped with the capacitive sensor.

BACKGROUND ART

Recently, the use of electronic devices, such as mobile communications apparatuses, including smart phones equipped with electrostatic capacitive touch panels have spread widely. Besides mobile telecommunications apparatuses, the number of electronic devices provided with capacitive touch panels, capacitive sensors and the like devices for input controllers increases so that the devices can be manipulated by executing predetermined input operations.

Such an electronic device is provided with, for instance, a transparent capacitive sensor disposed on a front screen of a display unit, such as a liquid-crystal display. A user visually identifies certain icons or menus that appear on the display unit through the sensor, and selects a desired icon or item. In other words, the user makes various input operations by touching certain positions of the sensor corresponding to the desired icons and menus with a finger.

When the user executes the touching operation by touching a position on the capacitive sensor with a finger, a capacitance at the position of the capacitive sensor changes. A controller installed in the device detects the touched position based on the change in the capacitance, and actuates a functional component assigned to the selected icon or menu.

Many of such electronic devices can detect manipulated positions when touched with either a bare finger or a gloved finger wearing a glove. The change of the capacitance of the capacitive sensor becomes smaller when the manipulation is made by touching it with the gloved finger than to touching with the bare finger. Therefore, in order to determine both of these touching manipulations, a reference value is predetermined for values of the changes of the capacitance resulting from the touching manipulations, as disclosed in, e.g. PTL 1. When a value of the change of the capacitance obtained by a touching manipulation is larger than the reference value mentioned above, it can be determined that the touching manipulation is made with the bare finger, or, when the value of the change of the capacitance is smaller than the reference value, it is determined that the touching manipulation is made with the gloved finger.

The conventional electronic device using a predetermined reference value for determining which of bare finger or a gloved finger the touching manipulation is made with can determine it with certain accuracy. However, the determinations may not be made accurately depending on such circumstances as places and conditions of use.

CITATION LIST

Patent Literature

PTL 1: Japanese Laid-Open Patent Publication, No. 2008-33701

SUMMARY

A basic scan executing a bare-hand scan for determining whether or not an electrode of a capacitive sensor is manipulated with a bare hand and a gloved-hand scan for determining whether or not the electrode is manipulated with a gloved hand is executed, thereby determining which of the bare hand and the gloved hand the electrode is manipulated with. This detection method reduces erroneous detection of the capacitive sensor.

DETAIL DESCRIPTION OF PREFERRED EMBODIMENTS

Exemplary Embodiment 1

Figure 1A:
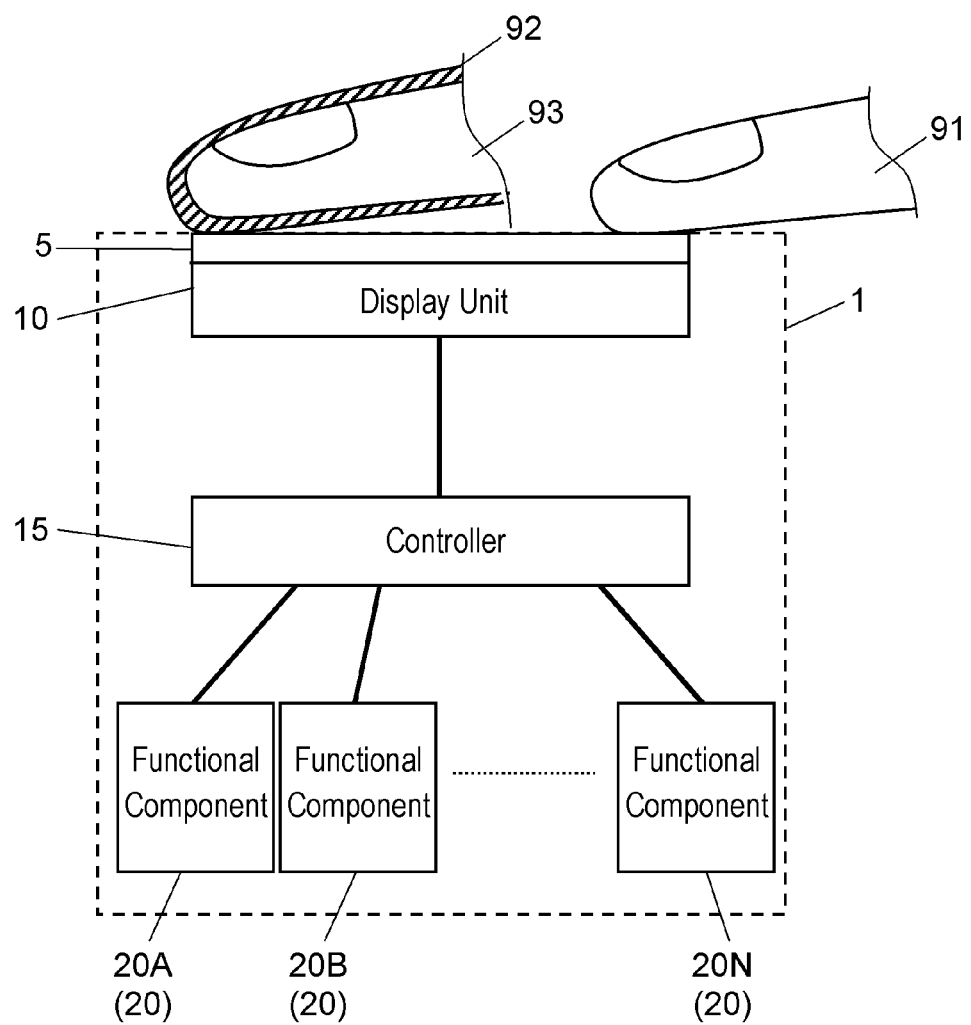
FIG. 1A is a block diagram of an electronic device including a capacitive sensor according to Exemplary Embodiment 1.

FIG. 1A is a block diagram of electronic device 1 including capacitive sensor 5 according to Exemplary Embodiment 1. Electronic device 1 includes display unit 10 provided with, e.g. a liquid-crystal display, capacitive sensor 5 disposed in front of display unit 10, controller 15 implemented by, e.g. a microcomputer connected to capacitive sensor 5 and display unit 10, and functional components 20 (20A, 20B, . . . , and 20N) controlled by controller 15. Controller 15 controls capacitive sensor 5 and display unit 10.

Figure 1B:
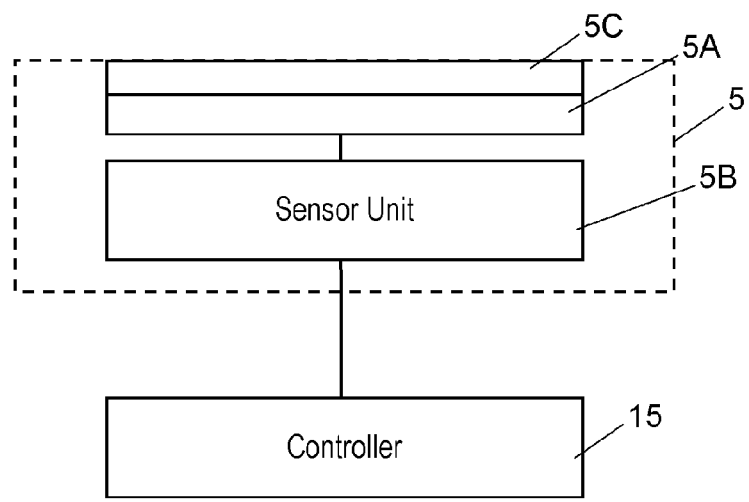
FIG. 1B is a block diagram of the capacitive sensor according to Embodiment 1.

FIG. 1B is a block diagram of capacitive sensor 5. Capacitive sensor 5 includes electrode 5A, sensor unit 5B connected to electrode 5A, and cover 5C with an insulating property that covers electrode 5A. A user makes touching manipulation of capacitive sensor 5 through electrode 5A by touching cover 5C with bare hand 91 or hand 93 wearing glove 92. Sensor unit 5B outputs, to controller 15, a detection signal corresponding to a capacitance of electrode 5A.

Controller 15 displays symbols, such as icons and menus, on display unit 10 when the user uses electronic device 1, so that the user visually identifies the symbols through capacitive sensor 5, and makes touching manipulation by contacting a position on capacitive sensor 5 corresponding to one of the symbols. This operation causes a change in the capacitance of the contacted position of capacitive sensor 5. Controller 15 detects the contacted position based on the change in the capacitance, and actuates functional component 20 assigned to the symbol.

In electronic device 1 including capacitive sensor 5 according to Embodiment 1, touching manipulations of capacitive sensor 5 can be detected satisfactorily with virtually no false detection regardless of whether the manipulations of capacitive sensor 5 are made with bare hand 91 or hand 93 wearing glove 92. An operation of electronic device 1 will be described below.

Figure 2:
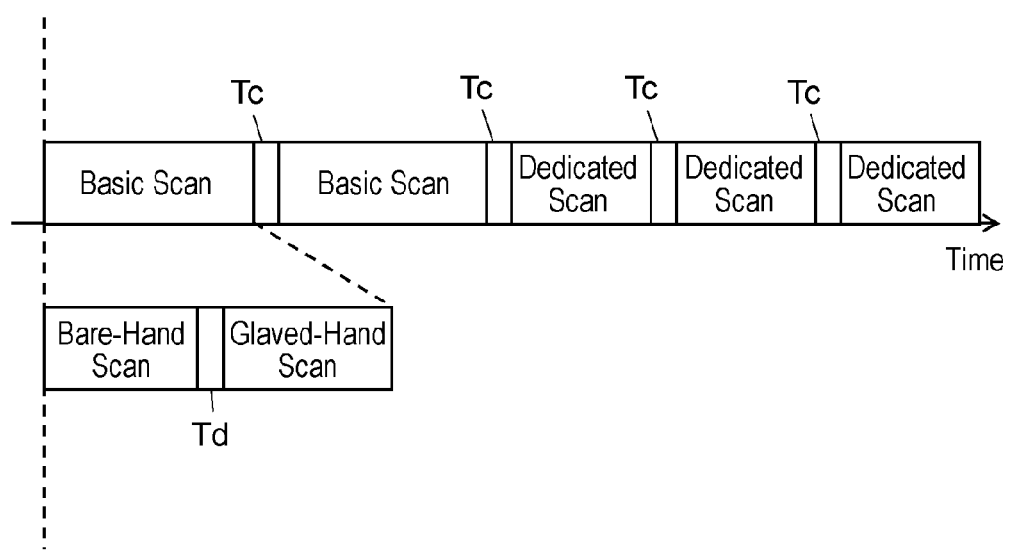
FIG. 2 illustrates a detection method using the capacitive sensor according to Embodiment 1.
Figure 3:
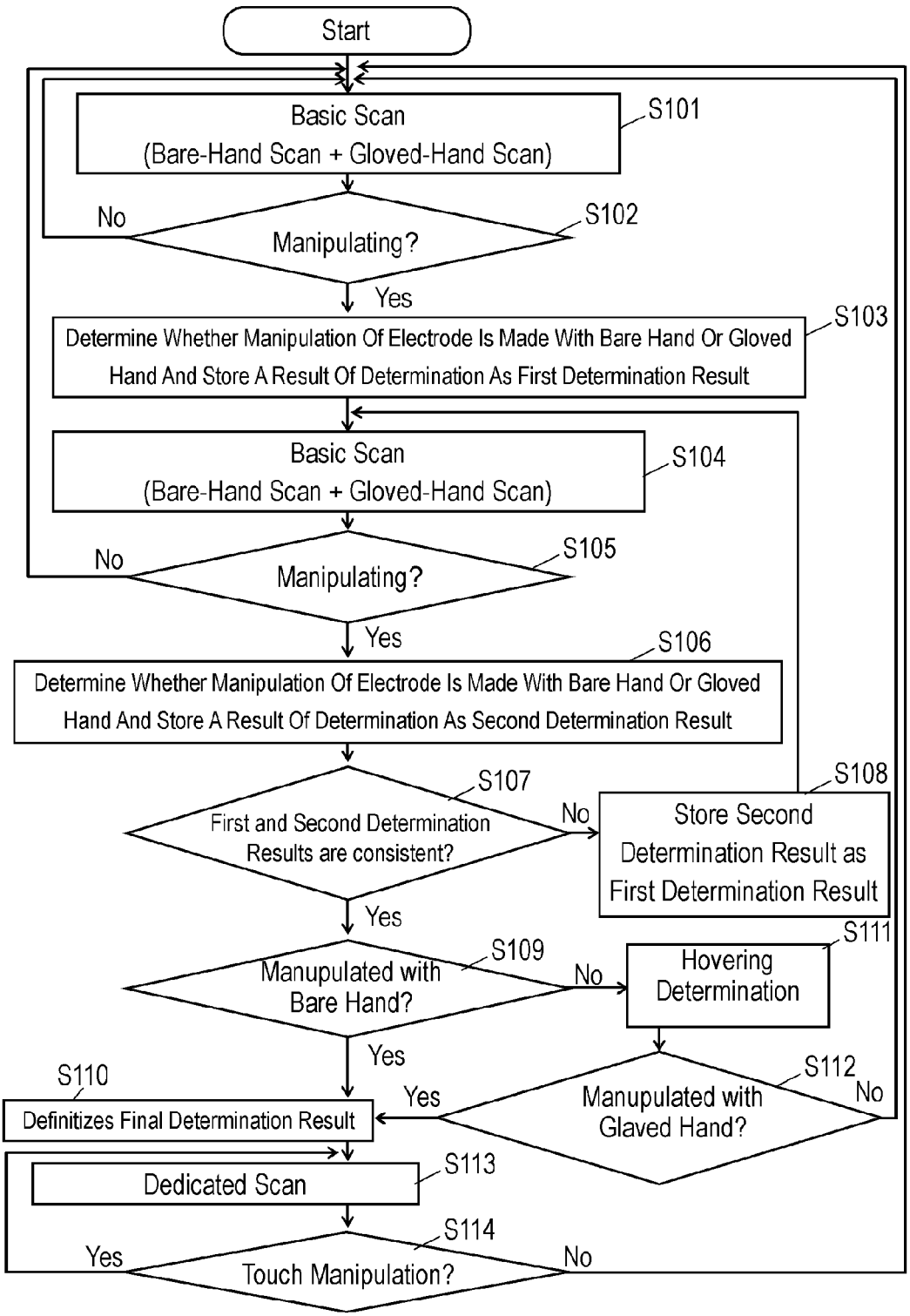
FIG. 3 is a flow chart showing the detection method using the capacitive sensor according to Embodiment 1.

FIG. 2 illustrates a detection method using capacitive sensor 5 of electronic device 1 according to Embodiment 1. FIG. 3 is a flow chart showing the detection method using capacitive sensor 5. Controller 15 executes a basic scan by using capacitive sensor 5, and determines whether capacitive sensor 5 is manipulated or not. In the basic scan, controller 15 executes a bare-hand scan for determining whether or not electrode 5A is manipulated with bare hand 91, and then, executes a gloved-hand scan for determining whether or not electrode 5A is manipulated with hand 93 wearing glove 92 after increasing sensitivity of sensor unit 5B by changing a parameter of sensor unit 5B of capacitive sensor 5 (step S101). Controller 15 updates the parameter of sensor unit 5B during period Td between the gloved-hand scan and the bare-hand scan of the basic scan. Controller 15 also updates the parameter of sensor unit 5B and arithmetic operation during period Tc between the basic scan and a dedicated scan.

Controller 15 repeats the basic scan while capacitive sensor 5 is not manipulated by the user. It takes a time of about a few hundred microseconds for a single basic scan including the arithmetic operation. Although there is no specific sequence for executing the bare-hand scan and the gloved-hand scan in the basic scan, it is preferable to first execute either one of the bare-hand scan and the gloved-hand scan that is presumed to be higher priority of manipulating capacitive sensor 5. The parameter may include a frequency, an input-output time, and an input-output frequency.

Controller 15 executes the basic scan at step S101, and determines whether electrode 5A of capacitive sensor 5 is manipulated or not (step S102). If controller 15 determines at step S102 that electrode 5A is manipulated ("Yes" at step S102), controller 15 further determines whether the manipulation of electrode 5A is made with bare hand 91 or hand 93 wearing glove 92, and stores a result of the determination as a first determination result (step S103). The manipulation can be detected at an appropriate level irrespective of bare hand 91 or hand 93 wearing glove 92, since both the bare-hand scan and the gloved-hand scan are executed individually and continuously in time sequence in this basic scan.

Figure 4:
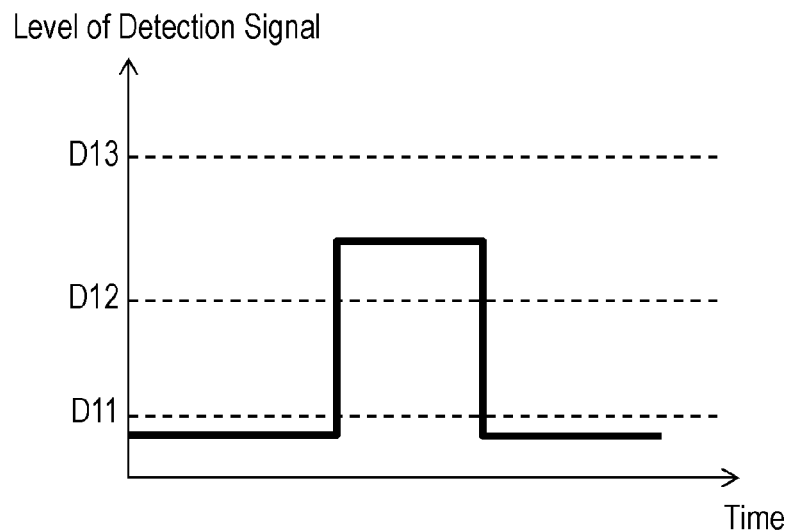
FIG. 4 illustrates a detection signal of the capacitive sensor according to Embodiment 1.
Figure 5:
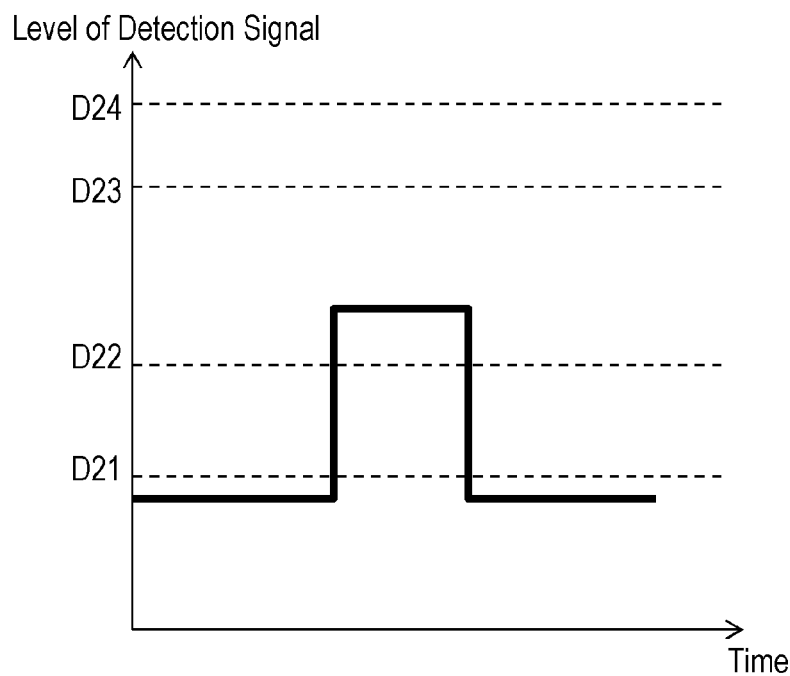
FIG. 5 illustrates another detection signal of the capacitive sensor according to Embodiment 1.

The bare-hand scan and the gloved-hand scan of the basic scan will be described below. FIGS. 4 and 5 show detection signals output from sensor unit 5B, respectively, during the bare-hand scan and the gloved-hand scan. In FIGS. 4 and 5, the vertical axes represent level of the detection signals, and the horizontal axes represent time.

In the bare-hand scan, controller 15 detects and calculates a capacitance of electrode 5A, and compares a level of the detection signal obtained as a result of the calculation with predetermined threshold D11 and another predetermined threshold D12 larger than threshold D11, as shown in FIG. 4. Controller 15 determines that electrode 5A of capacitive sensor 5 is manipulated with bare hand 91 if the level of the detection signal is larger than threshold D12. On the other hand, controller 15 determines that electrode 5A of capacitive sensor 5 is not manipulated with bare hand 91 if the level of the detection signal is not larger than threshold D12.

In the gloved-hand scan, controller 15 detects and calculates a capacitance of electrode 5A, and compares a level of the detection signal, i.e., a result of the calculation, with predetermined threshold D21 and another predetermined threshold D22 larger than threshold D21, as shown in FIG. 5. Controller 15 determines that electrode 5A is manipulated with hand 93 wearing glove 92 when the level of the detection signal is larger than threshold D22. On the other hand, controller 15 determines that electrode 5A is not manipulated with hand 93 wearing glove 92 when the level of the detection signal is not larger than threshold D22. Threshold D22 is much smaller than threshold D11 for the bare-hand scan shown in FIG. 4. In the gloved-hand scan, controller 15 determines that electrode 5A is not manipulated with hand 93 wearing glove 92 if the level of the detection signal is larger than threshold D23 larger than threshold D22 in order to avoid a false detection when being manipulated with bare hand 91 during the gloved-hand scan. Note that, in the gloved-hand scan, controller 15 makes a hovering determination to distinguish a hovering state in which bare hand 91 hovers around at a small distance away from capacitive sensor 5, from a state of manipulating electrode 5A with hand 93 wearing glove 92. The hovering determination will be detailed later.

As described above, controller 15 can detect manipulation at an appropriate level by the bare-hand scan and the gloved-hand scan executed continuously during the basic scan when the manipulation is made with either bare hand 91 or hand 93 wearing glove 92.

If controller 15 determines at step S102 that electrode 5A is not manipulated ("No" at step S102), controller 15 executes the basic scan at step S101.

After controller 15 stores the result of the determination as the first determination result at step S103, controller 15 executes the basic scan similarly to step S101 (step S104).

Controller 15 executes the basic scan at step S104 similarly to step 102 for determining whether or not electrode 5A of capacitive sensor 5 is manipulated (step S105). If controller 15 determines at step S105 that electrode 5A is manipulated ("Yes" at step S105), controller 15 further determines whether electrode 5A is manipulated with bare hand 91 or hand 93 wearing glove 92, and stores a result of the determination together with a manipulated position on electrode 5A as a second determination result (step S106).

When controller 15 determines at step S105 that electrode 5A is not manipulated ("No" at step S105), controller 15 executes the basic scan at step S101.

Controller 15, upon obtaining the second determination result at step S106, determines whether or not the second determination result is consistent with the first determination result (step S107).

If determining that the second determination result is consistent with the first determination result at step S107 ("Yes" at step S107), controller 15 determines whether or not capacitive sensor 5 is manipulated with bare hand 91 in both the first determination result and the second determination result (step S109). If controller 15 determines at step S109 that capacitive sensor 5 is manipulated with bare hand 91 ("Yes" at step S109), controller 15 finally determines that capacitive sensor 5 of capacitive sensor 5 is manipulated with bare hand 91, and definitizes it as the final determination result (step S110). Upon definitizing the final determination result at step S110, controller 15 executes a dedicated bare-hand scan that is a dedicated scan with a threshold for detecting a touching manipulation of bare hand 91 set at threshold D13 larger than threshold D12 (step S113). Controller 15 determines whether or not the user makes a touching manipulation of capacitive sensor 5 with bare hand 91 while the dedicated bare-hand scan at step S113 is executed (step S114). When the user makes a touching manipulation of capacitive sensor 5 with bare hand 91, a level of the detection signal exceeds threshold D13, so that controller 15 can determine that the touching manipulation is made ("Yes" at step S114). Controller 15 qualifies a position where the touching manipulation is made as the manipulated position. When controller 15 determines at step S114 that the touching manipulation is made with bare hand ("Yes" at step S114), controller 15 executes a dedicated bare-hand scan at step S113. According to Embodiment 1, the manipulation of capacitive sensor 5 is determined conclusively if the two consecutive determination results, i.e., the first determination result and the second determination result, are consistent with each other. However, the manipulation of capacitive sensor 5 may be determined definitively when three or more determination results are consistent with one another. If the level of the detection signal obtained by the dedicated bare-hand scan at step S113 is not larger than threshold D13, controller 15 determines that the touching manipulation is not made with bare hand 91 ("No" at step S114), and determines that the touching manipulation with bare hand 91 is ended, and controller 15 executes the basic scan at step S101.

On the other hand, if capacitive sensor 5 is not manipulated with bare hand 91 at step S109 ("No" at step S109), that is, if controller 15 determines that capacitive sensor 5 is manipulated with hand 93 wearing glove 92 in both of the first determination result and the second determination result, controller 15 then executes the above hovering determination (step S111). Controller 15 may determine erroneously that capacitive sensor 5 is manipulated with hand 93 wearing glove 92 in the gloved-hand scan even when capacitive sensor 5 is not manipulated with bare hand 91, but bare hand 91 just hovering at a position close to capacitive sensor 5.

Figure 6:
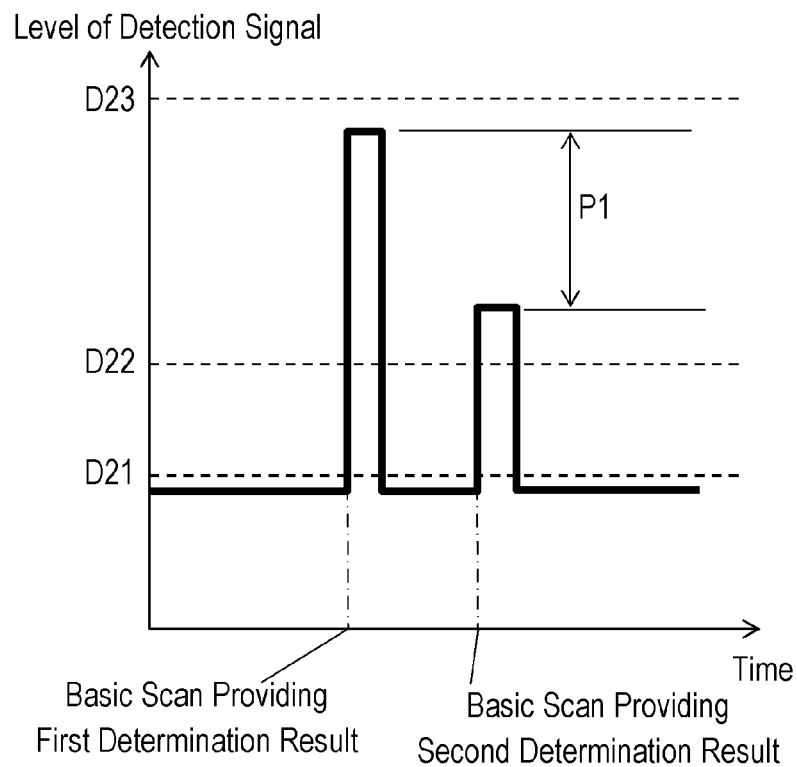
FIG. 6 illustrates still another detection signal of the capacitive sensor according to Embodiment 1.

According to Embodiment 1, controller 15 can prevent the above error of determination by executing the hovering determination in which controller 15 determines whether or not capacitive sensor 5 is manipulated with hand 93 wearing glove 92 based on both the first determination result and the second determination result (step S112). FIG. 6 shows levels of detection signals in the hovering determination of capacitive sensor 5 according to Embodiment 1. In FIG. 6, the vertical axis represents level of the detection signals, and the horizontal axis represents time. Since controller 15 increases the sensitivity of sensor unit 5B in the gloved-hand scan, the level of the detection signal shown FIG. 5 may be within a range larger than threshold D22 and smaller than threshold D23 even in the hovering state in which bare hand 91 does not capacitive sensor 5. In the hovering state, a position of bare hand 91 with respect to electrode 5A of capacitive sensor 5 changes more widely than a mode of manipulating capacitive sensor 5 with hand 93 wearing glove 92, and a difference P1 between a level of the detection signal by the gloved-hand scan in the first determination result and a level of the detection signal by another gloved-hand scan in the second determination result increases, as shown in FIG. 6. In capacitive sensor 5 according to Embodiment 1, the hovering determination is made by comparing the above difference P1 with a predetermined value. If the difference P1 is not larger than the predetermined value, controller 15 determines that capacitive sensor 5 is manipulated with hand 93 wearing gloves 92 in both of the first determination result and the second determination result ("Yes" at step S112). If the difference P1 is larger than the predetermined value, controller 15 determines that capacitive sensor 5 is not manipulated with hand 93 wearing glove 92 even if both of the first determination result and the second determination result are consistent with each other in that when capacitive sensor 5 is manipulated with hand 93 wearing glove 92. In the case that the manipulation is determined by verifying consistency of three or more determination results, controller 15 may preferably take a difference between the largest value and the smallest value among levels of the detection signals in those determination results, and compare it as difference P1 with the predetermined value.

If controller 15 determines at step S112 that capacitive sensor 5 is manipulated with hand 93 wearing glove 92 ("Yes" at step S112), controller 15 determines finally that capacitive sensor 5 is manipulated with hand 93 wearing glove 92, and definitizes it as the final determination result (step S110). Upon definitizing the final determination result at step S110, controller 15 executes a dedicated gloved-hand scan that is a dedicated scan with threshold D24 for detecting a touching manipulation of hand 93 wearing glove 92 (step S113). The threshold D24 is larger than threshold D23. Controller 15 determines whether or not the user makes a touching manipulation of capacitive sensor 5 with hand 93 wearing glove 92 while the dedicated gloved-hand scan at step S113 is executed (step S114). If the user makes a touching manipulation of capacitive sensor 5 with hand 93 wearing glove 92, a level of the detection signal exceeds threshold D24, and controller 15 determines that a touching manipulation is made ("Yes" at step S114). Controller 15 qualifies a manipulated position where the touching manipulation is detected as the manipulated position. If the level of the detection signal obtained at the dedicated gloved-hand scan at step S113 is not larger than threshold D24, controller 15 determines that the touching manipulation is not made with hand 93 wearing glove 92 ("No" at step S114), and determines that the touching manipulation is ended, and controller 15 executes the basic scan at step S101.

When controller 15 determines at step S112 that capacitive sensor 5 is not manipulated with hand 93 wearing glove 92 ("No" at step S112), controller 15 determines that bare hand 91 is in a hovering state without manipulating capacitive sensor 5, and then, executes the basic scans at step S101 to obtain a first determination result via steps S102 and S103.

If the first determination result and the second determination result are not consistent with each other at step S107 ("No" at step S107), controller 15 stores the second determination result as a first determination result (step S108), as shown in FIG. 3, executes the basic scan at step S104, obtains a new second determination result via steps S105 and S106, and determines again at step S107 whether or not the second determination result is consistent with the first determination result.

In capacitive sensor 5 according to Embodiment 1, controller 15 may not necessarily execute processes at steps S109, S111 and S112 shown in FIG. 3 for the hovering determination. In this case, upon determining at step S107 that the first and the second determination results are consistent with each other ("Yes" at step S107), controller 15 makes a final determination as whether electrode 5A of capacitive sensor 5 is manipulated with bare hand 91 or hand 93 wearing glove 92, and definitizes the final determination result at step S110.

As described above, electronic device 1 including capacitive sensor 5 according to Embodiment 1 is configured to establish the final determination result that definitizes one of bare hand 91 and hand 93 wearing glove 92 that manipulates capacitive sensor 5 by executing the basic scan for executing the bare-hand scan and the gloved-hand scan continuously. When the final determination result definitizes that capacitive sensor 5 is manipulated with bare hand 91, controller 15 executes a dedicated scan (i.e., dedicated bare-hand scan) at step S113 to determine presence or absence of a touching manipulation by using threshold D13 for detecting touching manipulation with bare hand 91. On the other hand, if the final determination result definitizes that capacitive sensor 5 is manipulated with hand 93 wearing glove 92, controller 15 executes another dedicated scan (i.e., dedicated gloved-hand scan) at step S113 to determine presence or absence of a touching manipulation by using threshold D24 for detecting touching manipulation with hand 93 wearing glove 92. Controller 15 detects the touching manipulation of the user, and actuates functional component 20 corresponding to the position on electrode 5A of capacitive sensor 5.

As a result, it is possible to detect touching manipulation made with any of bare hand 91 and hand 93 wearing glove 92 at a proper sensitivity by executing the basic scan, and hence, to determine the manipulation of capacitive sensor 5 with high accuracy and virtually no false detection. It is also possible to reduce false detection of manipulations on capacitive sensor 5 since the final determination result is obtained by confirming that the first determination result and the second determination result obtained from the plural basic scans are consistent with each other.

Upon definitizing the final determination result, controller 15 repeats a dedicated scan that is only the scan of such a manipulation that is obtained by the final determination result on capacitive sensor 5, as shown in FIG. 2. If controller 15 determines finally that capacitive sensor 5 is manipulated with bare hand 91 and definitizes a final determination result at step S110 shown in FIG. 3, controller 15 then repeats a dedicated scan (i.e., dedicated bare-hand scan) at step S113 to detect a touching manipulation of bare hand 91. On the other hand, if controller 15 determines finally that capacitive sensor 5 is manipulated with hand 93 wearing glove 92 and definitizes a final determination result at step S110 shown in FIG. 3, controller 15 then repeats a dedicated scan (i.e., dedicated gloved-hand scan) at step S113 to detect a touching manipulation of hand 93 wearing glove 92. Controller 15 repeats the dedicated scan until the touching manipulations stop. This operation allows controller 15 to continue to detect the manipulations efficiently and accurately in a short time, and reduce false detection.

When the touching manipulation stops while controller 15 repeats the dedicated scan, controller 15 detects the stopping of the touching manipulation through the dedicated scan, terminates an operation of functional component 20, and executes the basic scan at step S101 shown in FIG. 3.

According to Embodiment 1, electronic device 1 includes functional components 20 (i.e., 20A, 20B, . . . , and 20N) as devices to be activated by touching manipulations. These devices may be separate apparatuses controlled by controller 15.

Capacitive sensor 5 may be disposed as a discrete unit separate from display unit 10.

In capacitive sensor 5 according to Embodiment 1, glove 92 is thick, and has an insulating property. If glove 92 is thin or has an electrically conductive property, controller 15 determines that capacitive sensor 5 is manipulated with bare hand 91 even when capacitive sensor 5 is manipulated with hand 93 wearing glove 92. Controller 15 can thus determine the manipulation of capacitive sensor 5 stability and accurately.

As described above, controller 15 executes a first basic scan by executing the bare-hand scan for determining whether or not electrode 5A is manipulated with bare hand 91, and the gloved-hand scan for determining whether or not electrode 5A is manipulated with hand 93 wearing glove 92, so as to determine which of bare hand 91 and hand 93 wearing glove 92 electrode 5A is manipulated with.

Controller 15 may execute the dedicated bare-hand scan for determining whether or not electrode 5A is manipulated with bare hand 91 after determining that electrode 5A is manipulated with bare hand 91 by executing the first basic scan. In addition, controller 15 may execute the dedicated gloved-hand scan for determining whether or not electrode 5A is manipulated with hand 93 wearing glove 92 after determining that electrode 5A is manipulated with hand 93 wearing glove 92 by executing the first basic scan.

Subsequent to the first basic scan, controller 15 may execute at least one a second basic scan for determining which of bare hand 91 and hand 93 wearing glove 92 the electrode 5A is manipulated with by executing the bare-hand scan and the gloved-hand scan. In this case, controller 15 makes a final determination that electrode 5A is manipulated with bare hand 91 if determining that electrode 5A is manipulated with bare hand 91 in all of the first basic scan and the at least one second basic scan. In addition, controller 15 makes a final determination that electrode 5A is manipulated with hand 93 wearing glove 92 if determining that electrode 5A is manipulated with hand 93 wearing glove 92 in all of the first basic scan and the at least one second basic scan.

Controller 15 obtains plural detection signals corresponding to capacitances of electrode 5A of capacitive sensor 5 if controller 15 determines that electrode 5A is manipulated with hand 93 wearing glove 92 in the first basic scan and the at least one second basic scan. Controller 15 makes a final determination that electrode 5A is manipulated with hand 93 wearing glove 92 if a difference between the largest value and the smallest value of the plural detection signals is smaller than a predetermined value. Controller 15 makes a final determination that electrode 5A is not manipulated with hand 93 wearing glove 92 if the difference between the largest value and the smallest value of the plural detection signals is larger than the predetermined value.

Controller 15 may execute the dedicated bare-hand scan for determining whether or not electrode 5A is manipulated with bare hand 91 after making the final determination that electrode 5A is manipulated with bare hand 91. Controller 15 may execute the dedicated gloved-hand scan for determining whether or not electrode 5A is manipulated with hand 93 wearing glove 92 after making the final determination that electrode 5A is manipulated with hand 93 wearing glove 92.

The shape and configuration of capacitive sensor 5 are not limited and may be a capacitive touch panel, for instance, as long as it allows controller 15 to detect a capacitance thereof changing when a finger or the like object approaches or contacts the panel, and to qualify a position of the manipulation based on the change in the capacitance. Moreover, electronic device 1 including capacitive sensor 5 can be any device, such as an electronic appliance, vehicle-mounted equipment and steering-wheel switch of vehicles, besides a mobile communications apparatus and data communication terminal like a smart phone. In addition, capacitive sensor 5 and controller 15 according to Embodiment 1 are applicable to any electronic component configured to execute predetermined functions by touching manipulations.

Exemplary Embodiment 2

Figure 7:
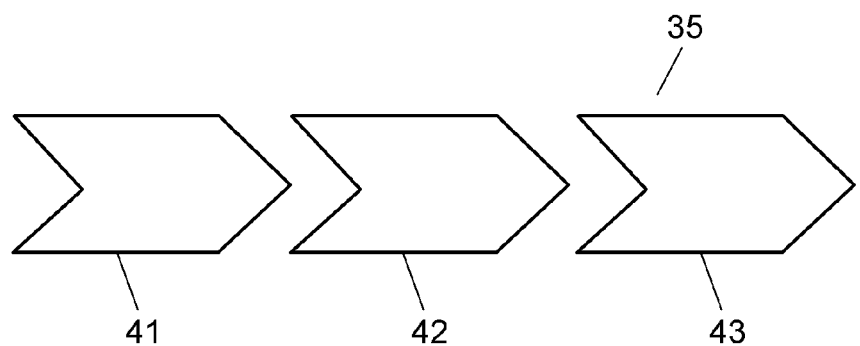
FIG. 7 illustrates electrodes of a capacitive sensor according to Exemplary Embodiment 2.

FIG. 7 is a schematic diagram of electrodes 41, 42 and 43 of capacitive sensor 35 according to Exemplary Embodiment 2. Capacitive sensor 35 includes three electrodes 41 to 43 that are independent from each other and disposed along a straight line while capacitive sensor 5 according to Embodiment 1 shown in FIG. 1B includes single electrode 5A. Capacitive sensor 35 is connected to controller 15 similarly to capacitive sensor 5 according to Embodiment 1 shown in FIG. 1A.

In electronic device 1 including capacitive sensor 5 including single electrode 5A according to Embodiment 1, capacitive sensor 5 is manipulated by being touched. However, the capacitive sensor may include plural electrodes. Electronic device 1 including capacitive sensor 35 including plural electrodes 41 to 43 can detect an input operation of not only a touching manipulation of capacitive sensor 35 but also so-called gesture operation, such as a flicking manipulation and a sliding manipulation, by which the electrodes 41 to 43 are consecutively manipulated with a finger being slid on an upper surface of capacitive sensor 35. Electronic device 1 including capacitive sensor 35 according to Embodiment 2 also has an advantage of reducing false detection even in gesture operation.

Controller 15 executes a basic scan on each of electrodes 41 to 43 of capacitive sensor 35 independently to definitize a final determination result at step S110 shown in FIG. 3, similarly to electrode 5A of capacitive sensor 5 according to Embodiment 1. In capacitive sensor 35 according to Embodiment 2, controller 15 executes a bare-hand scan on electrodes 41, 42 and 43 sequentially, and then, executes a gloved-hand scan on electrodes 41, 42 and 43 sequentially. In other words, controller 15 executes the basic scan not simultaneously on all electrodes 41 to 43.

In capacitive sensor 35 according to Embodiment 2, if a final determination result is definitized on any one of electrodes 41, 42 and 43 at step S110, a dedicated scan is executed on all of electrodes 41 to 43 for determining the same manipulation as that obtained from the final determination result. If the final determination result that the manipulation is made with bare hand 91 at step S110 is definitized first on electrode 41 among electrodes 41 to 43, for instance, controller 15 starts executing the dedicated scan for manipulation of bare hand 91 on other electrodes 42 and 43 without executing the basic scan even though the dedicated final determination results are not definitized on electrodes 42 and 43. This operation can reduce false detection in the gesture operation in which electrodes 41 to 43 of capacitive sensor 35 are manipulated consecutively.

In regard to detection of touching manipulation during the dedicated scan, controller 15 detects a touching manipulation with bare hand 91 by executing a dedicated scan using threshold D13 (i.e., dedicated bare-hand scan) similarly to capacitive sensor 5 according to Embodiment 1 if controller 15 definitizes the final determination result that capacitive sensor 35 is manipulated with bare hand 91. On the other hand, if controller 15 definitizes the final determination result that capacitive sensor 35 is manipulated with hand 93 wearing glove 92, controller 15 detects the touching manipulation with hand 93 wearing glove 92 by executing a dedicated scan using threshold D24 (i.e., dedicated gloved-hand scan).

An operation of capacitive sensor 35 in which electrodes 41 to 43 are gesturally manipulated with bare hand 91 in order of electrodes 41, 42 and 43 will be described below.

Figure 8:
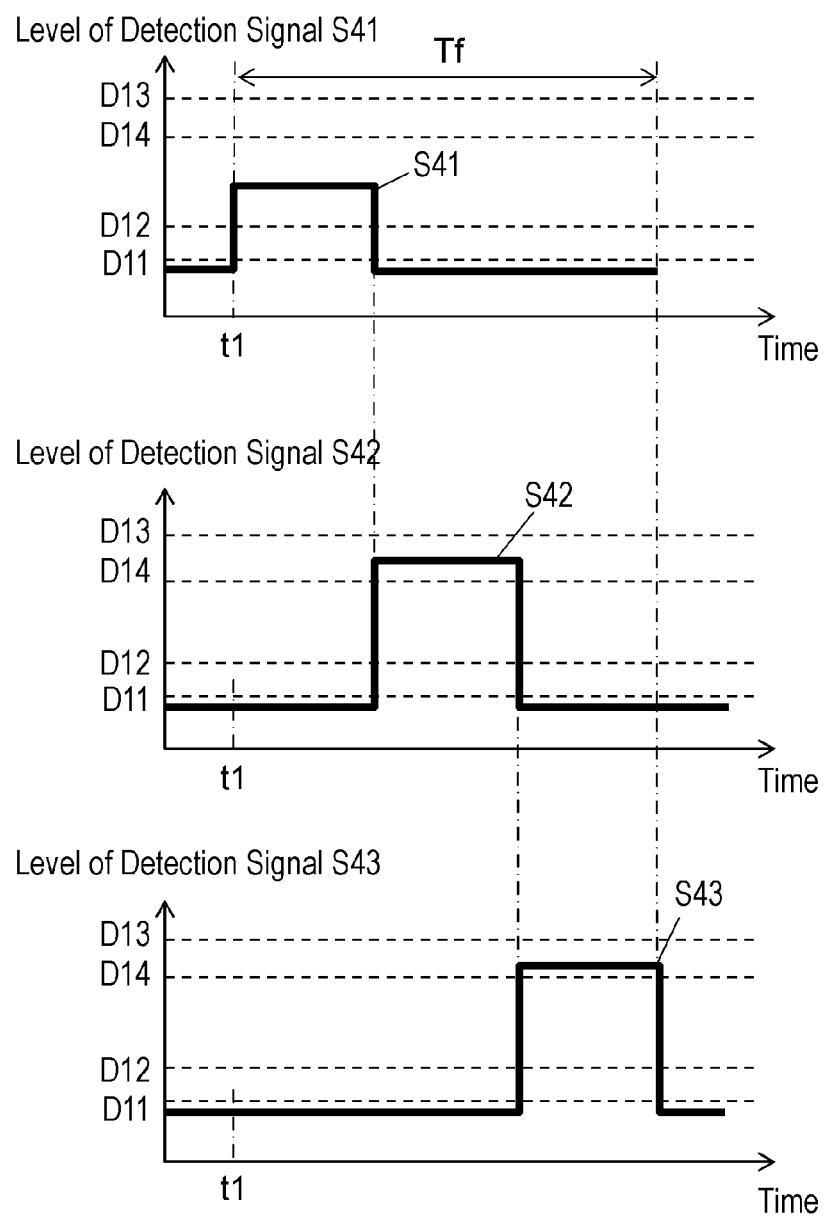
FIG. 8 illustrates a detection signal of the capacitive sensor according to Embodiment 2.
Figure 9:
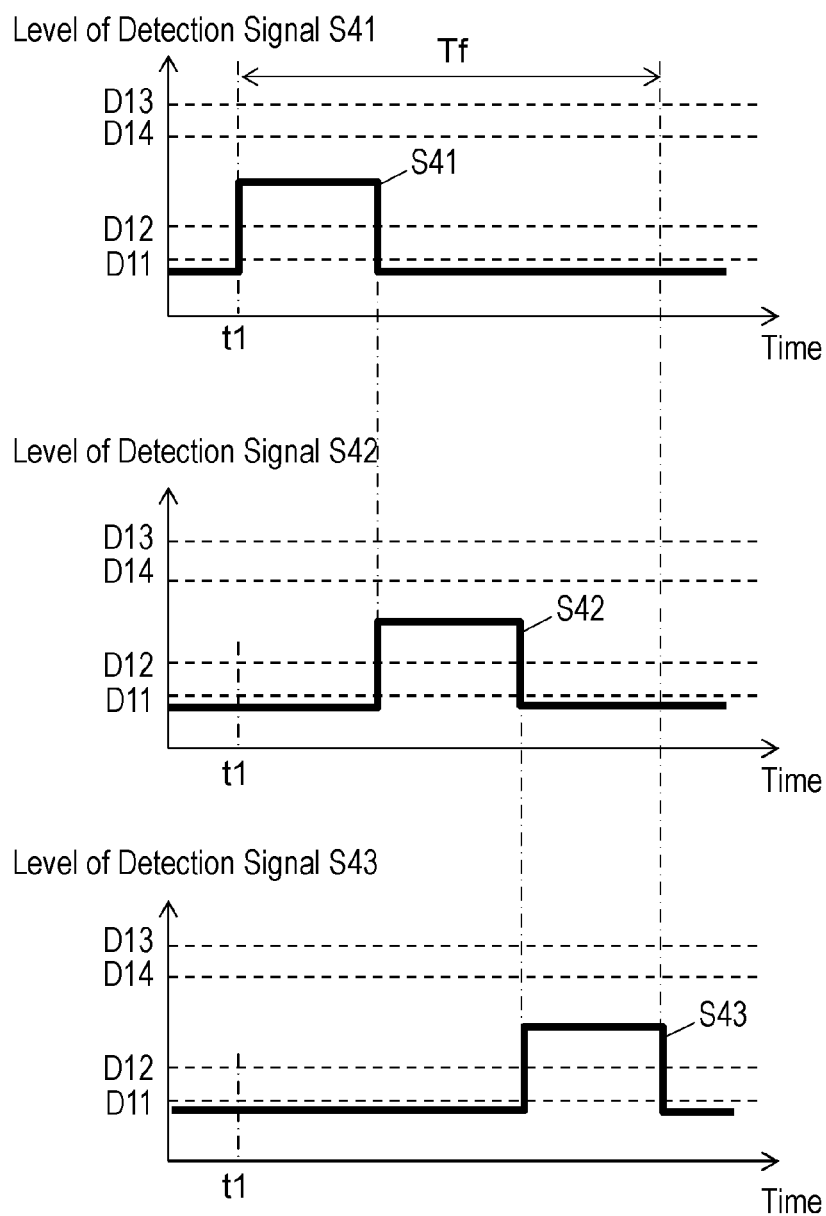
FIG. 9 illustrates another detection signal of the capacitive sensor according to Embodiment 2.

FIGS. 8 and 9 show levels of detection signals when electrodes 41 to 43 of capacitive sensor 35 are manipulated consecutively in order of electrodes 41, 42 and 43 with bare hand 91. In FIGS. 8 and 9, the vertical axes represent level of the detection signals, and the horizontal axes represent time. When electrodes 41 to 43 of capacitive sensor 35 are manipulated, capacitive sensor 35 outputs detection signals S41 to S43, respectively.

Controller 15 repeats a basic scan on each of electrodes 41 to 43 until capacitive sensor 35 is manipulated with bare hand 91.

If electrode 41 is manipulated with bare hand 91, a level of detection signal S41 becomes larger than threshold D12 larger than threshold D11, as shown in FIG. 8. Consequently, controller 15 definitizes as a final determination result that the manipulation of electrode 41 is made with bare hand 91, and then, repeats the dedicated scan (i.e., dedicated bare-hand scan) by using threshold D14 larger than threshold D12. According to Embodiment 2, threshold D14 for detecting a gesture operation is smaller than threshold D13 for detecting a touching manipulation. However, threshold D14 may be identical to threshold D13.

In the operation shown in FIG. 8, a final determination result of electrode 41 is definitized at time t1. A final determination result of electrode 42 is not definitized since a level of detection signal S42 of electrode 42 is smaller than that of threshold D11 at time t1. Nevertheless, controller 15 repeats the dedicated scan (i.e., dedicated bare-hand scan) using threshold D14 for detecting a gesture operation of electrode 42 from time t1. Likewise, a final determination result of electrode 43 is not definitized since a level of detection signal S43 of electrode 43 is smaller than that of threshold D11 at time t1. However, controller 15 repeats the dedicated scan (i.e., dedicated bare-hand scan) using threshold D14 for detecting a gesture operation of electrode 43 from time t1.

If the levels of detection signals S42 and S43 produced by manipulation of electrodes 42 and 43 exceed threshold D14 for detecting presence of gesture operation within predetermined period Tf from time t1, controller 15 determines that the user makes gesture operation on electrodes 41 to 43. Controller 15 either actuates functional component 20, or executes a task, such as scrolling, expanding and reducing an image displayed on display unit 10 in response to the gesture operation. Detection signal S41 produced by manipulation of electrode 41 may exceed threshold D14.

If at least one of the levels of detection signals S42 and S43 does not exceed threshold D14 for detecting presence of a gesture operation within predetermined period Tf from time t1, that is, the levels of detection signals S42 and S43 produced by manipulation of electrodes 42 and 43 are not larger than threshold D14 during predetermined period Tf from time t1, as shown in FIG. 9, controller 15 determines that the user does not make gesture operation on electrodes 41 to 43. Predetermined period Tf is set at 300 msec. in capacitive sensor 5 according to Embodiment 2, but can be determined as appropriate without specific restriction.

An operation of capacitive sensor 35 upon electrodes 41 to 43 to have a gesture operation in order of electrodes 41, 42 and 43 with hand 93 wearing glove 92 will be described below.

Figure 10:
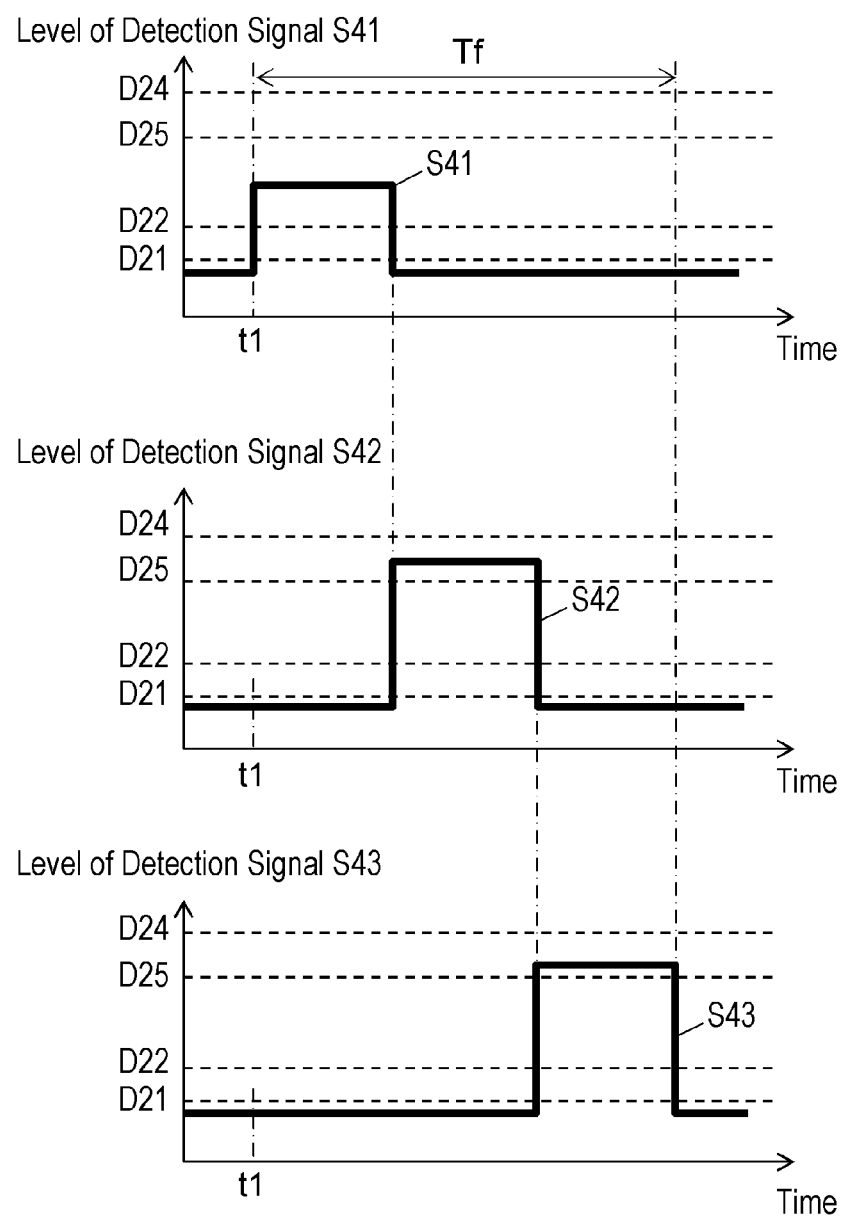
FIG. 10 illustrates still another detection signal of the capacitive sensor according to Embodiment 2.
Figure 11:
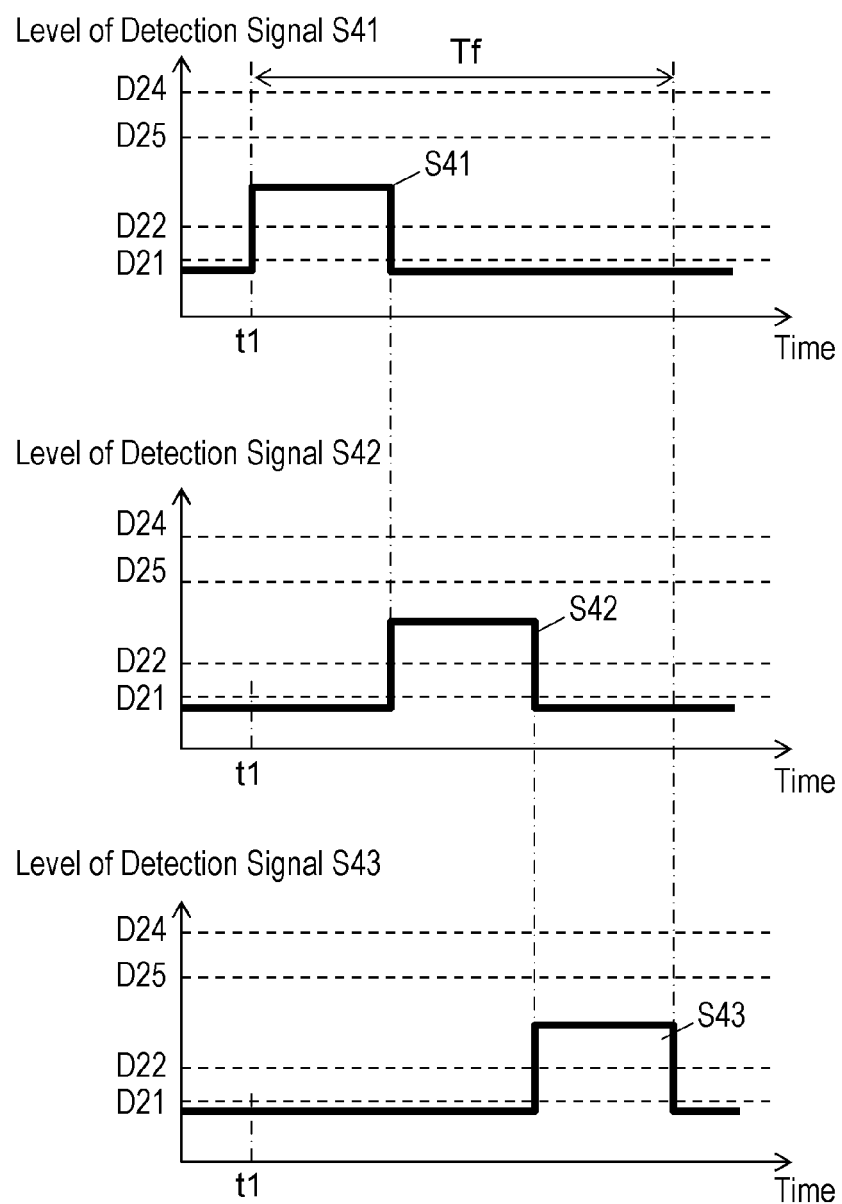
FIG. 11 illustrates a further detection signal of the capacitive sensor according to Embodiment 2.

FIGS. 10 and 11 show levels of detection signals when electrodes 41 to 43 of capacitive sensor 35 are manipulated consecutively in order of electrodes 41, 42 and 43 with hand 93 wearing glove 92. In FIGS. 10 and 11, the vertical axes represent level of the detection signals, and the horizontal axes represent time. When electrodes 41 to 43 of capacitive sensor 35 are manipulated, capacitive sensor 35 outputs detection signals S41 to S43, respectively.

Controller 15 repeats a dedicated basic scan on each of electrodes 41 to 43 until capacitive sensor 35 is manipulated with hand 93 wearing glove 92.

When electrode 41 is manipulated with hand 93 wearing glove 92, a level of detection signal S41 becomes larger than threshold D22 larger than threshold D21, as shown in FIG. 10. Consequently, controller 15 definitizes as a final determination result that the manipulation of electrode 41 is made with hand 93 wearing glove 92, and then, repeats a dedicated scan (i.e., dedicated gloved-hand scan) by using threshold D25 larger than threshold D22. Here, threshold D25 for detecting the gesture operation has a smaller value than threshold D24 for detecting the touching manipulation. However, threshold D25 may have the same value as threshold D24.

In the operation shown in FIG. 10, a final determination result of electrode 41 is definitized at time t1. A final determination result of electrode 42 is not definitized since a level of detection signal S42 of electrode 42 is smaller than that of threshold D21 at time t1. Nevertheless, controller 15 repeats the dedicated scan (i.e., dedicated gloved-hand scan) using threshold D25 for detecting presence of a gesture operation on electrode 42 from time t1. Likewise, a final determination result of electrode 43 is not definitized since a level of detection signal S43 of electrode 43 is smaller than that of threshold D21 at time t1. However, controller 15 repeats the dedicated scan (i.e., dedicated gloved-hand scan) using threshold D25 for detecting presence of a gesture operation on electrode 43 from time t1.

When the levels of detection signals S42 and S43 produced by manipulation on electrodes 42 and 43 exceed threshold D25 for detecting presence of a gesture operation within predetermined period Tf from time t1, controller 15 determines that the user makes gesture operation on electrodes 41 to 43. Controller 15 either actuates functional component 20 or executes a task, such as scrolling, expanding and reducing an image displayed on display unit 10, in response to the gesture operation. Detection signal S41 produced by the manipulation of electrode 41 may exceed threshold D25.

When at least one of the levels of detection signals S42 and S43 does not exceed threshold D25 for detecting presence of the gesture operation within predetermined period Tf from time t1, that is, the levels of detection signals S42 and S43 produced by manipulation on electrodes 42 and 43 are not larger than threshold D25 during the predetermined period Tf from time t1, as shown in FIG. 11, controller 15 determines that the user does not make gesture operation on electrodes 41 to 43.

As described above, controller 15 determines that a gesture operation is made on at least electrodes 41 and 42 if determining that electrode 42 is manipulated with bare hand 91 within the predetermined period Tf after the final determination that electrode 41 is manipulated with bare hand 91 at time t1. In addition, controller 15 determines that the gesture operation is made on at least electrodes 41 and 42 if determining that electrode 42 is manipulated with hand 93 wearing glove 92 within the predetermined period Tf after the final determination that electrode 41 is manipulated with hand 93 wearing glove 92 at time t1.

Capacitive sensor 35 according to Embodiment 2 includes three electrodes 41 to 43 arranged on a straight line, this embodiment shall not be construed as limiting the number of the electrodes or their positions of arrangement.

INDUSTRIAL APPLICABILITY

A detection method using a capacitive sensor according to the present invention can reduce false detection, and is useful for a variety of electronic devices.

REFERENCE MARKS IN THE DRAWINGS

1 electronic device
5 capacitive sensor
5A electrode (first electrode)
15 controller
35 capacitive sensor
41 electrode (first electrode)
42 electrode (second electrode)

The invention claimed is:

1. A detection method using a capacitive sensor, the method comprising:
   preparing a capacitive sensor including a first electrode; and
   executing a first basic scan for determining which of a bare hand and a gloved hand the first electrode is manipulated with by executing a bare-hand scan for determining whether or not the first electrode of the capacitive sensor is manipulated with the bare hand and a gloved-hand scan for determining whether or not the first electrode is manipulated with the gloved hand,
   wherein said executing the first basic scan comprises:
      executing one of the bare-hand scan and the gloved-hand scan;
      after said executing the one of the bare-hand scan and the gloved-hand scan, changing sensitivity of the capacitive sensor; and
      after said changing the sensitivity of the capacitive sensor, executive another one of the bare-hand scan and the gloved-hand scan.

2. The detection method according to claim 1, further comprising:
   in a case of determining in said executing of the first basic scan that the first electrode is manipulated with the bare hand, executing a dedicated bare-hand scan for determining whether or not the first electrode is manipulated with the bare hand; and
   in a case of determining in said executing of the first basic scan that the first electrode is manipulated with the gloved hand, executing a dedicated gloved-hand scan for determining whether or not the first electrode is manipulated with the gloved hand.

3. The detection method according to claim 1, further comprising:
   subsequent to the first basic scan, executing at least once a second basic scan for determining which of the bare hand or the gloved hand the first electrode is manipulated with, by executing the bare-hand scan and the gloved-hand scan;
   determining finally that the first electrode is manipulated with the bare hand when determining, in all of said executing of the first basic scan and said executing of the at least one second basic scan, that the first electrode is manipulated with the bare hand; and determining finally that the first electrode is manipulated with the gloved hand when determining, in all of said executing of the first basic scan and said executing of the at least one second basic scan, that the first electrode is manipulated with the gloved hand.

4. The detection method according to claim 3, further comprising
obtaining a plurality of detection signals corresponding to a capacitance of the first electrode of the capacitive sensor when determining, in said executing of the first basic scan and said executing of the at least one second basic scan, that the first electrode is manipulated with the gloved hand,
wherein said determining finally that the first electrode is manipulated with the gloved hand comprises:
determining finally that the first electrode is manipulated with the gloved hand when a difference between a largest value of the plurality of detection signals and a smallest value of the plurality of detection signals is smaller than a predetermined value; and
determining finally that the first electrode is not manipulated with the gloved hand when the difference is not smaller than the predetermined value.

5. The detection method according to claim 3, further comprising:
subsequent to said determining finally that the first electrode is manipulated with the bare hand, executing a dedicated bare-hand scan for determining whether or not the first electrode is manipulated with the bare hand; and
subsequent to said determining finally that the first electrode is manipulated with the gloved hand, executing a dedicated gloved-hand scan for determining whether or not the first electrode is manipulated with the gloved hand.

6. The detection method according to claim 3,
wherein the capacitive sensor further includes a second electrode,
said detection method further comprising determining that the first electrode and the second electrode are manipulated with a gesture operation when determining that the second electrode is manipulated with the bare hand within a predetermined period after a time point when determining finally that the first electrode is manipulated with the bare hand in said determining finally that the first electrode is manipulated with the bare hand.

7. The detection method according to claim 3,
wherein the capacitive sensor further includes a second electrode,
said detection method further comprising determining that the first electrode and the second electrode are manipulated with a gesture operation when determining that the second electrode is manipulated with the gloved hand within a predetermined period after a time point when determining finally that the first electrode is manipulated with the gloved hand in said determining finally that the first electrode is manipulated with the gloved hand.

8. The detection method according to claim 1,
wherein the capacitive sensor further includes a second electrode,
said detection method further comprising determining that the first electrode and the second electrode are manipulated with a gesture operation when determining that the second electrode is manipulated with the bare hand within a predetermined period after a time point when determining that the first electrode is manipulated with the bare hand in said executing of the first basic scan.

9. The detection method according to claim 1,
wherein the capacitive sensor further includes a second electrode,
said detection method further comprising determining that the first electrode and the second electrode are manipulated with a gesture operation when determining that the second electrode is manipulated with the gloved hand within a predetermined period after a time point in time when determining that the first electrode is manipulated with the gloved hand in said executing of the first basic scan.

10. An electronic device comprising:
a capacitive sensor including an electrode; and
a controller connected to the capacitive sensor,
wherein the controller is operable to execute a basic scan for determining which of a bare hand or a gloved hand the electrode is manipulated with by:
executing one of a bare-hand scan for determine whether or not the electrode of the capacitive sensor is manipulated with the bare hand and a gloved-hand scan for determining whether or not the electrode is manipulated with the gloved hand;
changing sensitivity of the capacitive sensor after executing the one of the bare-hand scan and the gloved-hand scan; and
executing another one of the bare-hand scan and the gloved-hand scan after changing the sensitivity of the capacitive sensor.

* * * * *